Oct. 9, 1956  F. E. WILEY  2,765,682
IMPROVED METHOD OF MAKING EMBOSSING ROLLS
Filed Dec. 6, 1951
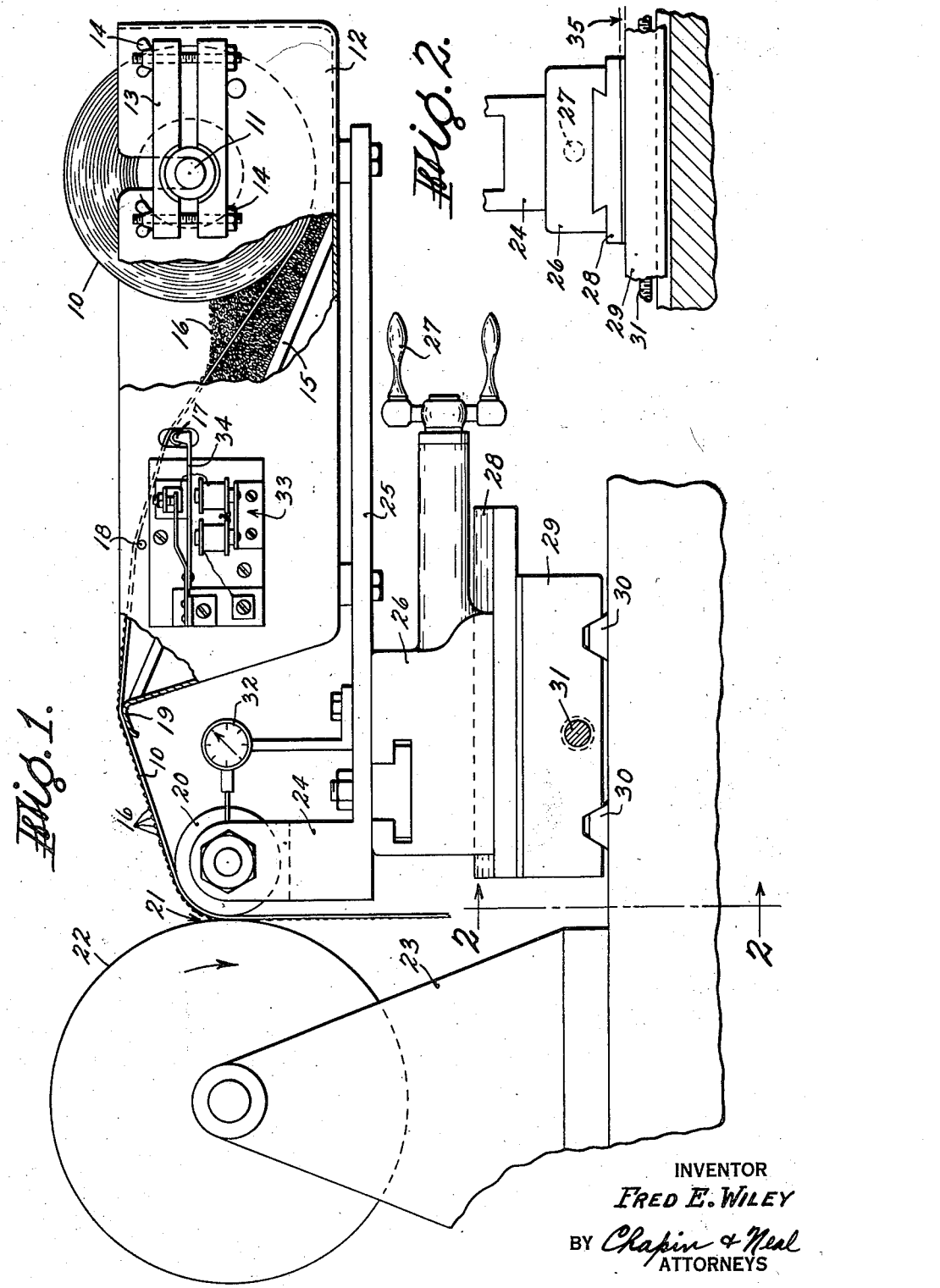
INVENTOR
FRED E. WILEY
BY Chapin & Neal
ATTORNEYS United States Patent Office 2,765,682
Patented Oct. 9, 1956

2,765,682

IMPROVED METHOD OF MAKING EMBOSSING ROLLS

Fred E. Wiley, Norwood, Ohio, assignor to The Grote Manufacturing Co., Inc., Bellevue, Ky., a corporation of Kentucky Application December 6, 1951, Serial No. 260,264

16 Claims. (Cl. 76—107)

This invention relates to an improved method and apparatus for embossing a metal roll with fire polished glass beads, or other beads having similar characteristics as to surface polish and of adequate hardness, to provide polished embossing cavities therein for use in making continuous reflex reflecting strips or sheets.

Reflex reflecting sheets may be made by embossing lens formations on the surface of a sheet of transparent material and backing the sheet with a reflector such as metal foil or similar material. The cavities in the embossing roll, however, must have optically smooth surfaces for the surfaces of the embossed lens to be optically smooth, which is necessary for a good quality reflex reflecting strip or sheet.

Common methods of engraving, hobbing or etching or a combination of such methods are not satisfactory, it being impossible to provide the necessary smooth finish in the cavities of an embossing roll so formed, when the cavities approach the order of size of the beads herein disclosed.

As disclosed in copending application of Richardson and Larson, Serial No. 256,351, filed November 14, 1951, suitable embossing has been found possible by passing clean, fire-polished glass beads into the nip of two rotating metal rolls, where one of the rolls, the roll to be embossed, is polished and is preferably softer than the other, the pressure roller. Sufficient pressure must be applied to hold the rolls together as the beads are pressed into the surface of the softer roll in passing through the rolls. When the pressure roller presses the glass beads into the roller to be embossed, hemispherical cavities are formed which have the same highly polished surfaces as the surface of the beads.

The method, described above, presents certain difficulties, particularly in the case of large diameter rolls. Small rolls are satisfactorily handled by the above method if the relative hardness of the two rolls is suitably adjusted and the roll to be embossed is no harder than a Brinell hardness of 200. When, however, rolls of larger diameter are used, e. g. 14 inches and over, or when a roll of work hardened stainless steel is being embossed, the rolls tend to grind or crush the beads and beads not crushed may become covered with glass dust from the crushing of other beads. In addition, the embossing may not be uniform in that some beads fracture before the embossing occurs and others are pushed back from the nip of the rolls by the pressure of excess beads in the nip of the rolls. This sometimes results in a poor embossing pattern with cavities covered by glass dust and only partially or imperfectly formed.

An object of this invention is to provide an improved method and apparatus for embossing metal rolls with glass beads or the like, particularly rolls of large diameter, which will give greater assurance of clean, well formed embossing cavities.

Another object of this invention is to provide a method and apparatus for embossing a metal roll with glass beads or the like and which will better distribute the embossing cavities in the roll.

A further object of this invention is to provide a method and apparatus for embossing a metal roll with glass beads or the like and which will apply a substantially uniformly distributed embossing pressure to the beads instead of "point" loading and tending to fracture the beads.

Further objects, advantages and features of the invention will become apparent from the preferred method and apparatus shown in the drawing and described and pointed out in the accompanying specification and claims.

In the drawing:

Fig. 1 is a side elevational view, partly broken away and in section, of apparatus embodying the invention; and Fig. 2 is a cross section taken on line 2—2 of Fig. 1.

Referring more particularly to the drawing, a supply roll of deformable material such as synthetic resin plastic or cellulose tape 10, having one side coated with a tacky substance such as a pressure sensitive adhesive, is mounted on a rotatable shaft 11 in a tank 12. A frictional hold back brake 13 is provided on shaft 11 and is adjustable, as by take-up bolts 14, to regulate the tension of tape 10 when the tape is pulled from the roll.

Tank 12 contains a diagonally sloping partition 15 and the portion of the tank containing the tape roll is partially filled with glass beads 16 or the like, which are clean, fire polished and of uniform size, forming a bath of beads around the tape.

Tape 10 passes through the bath of beads, tacky side up, and then, successively, over a vibrator 17, a stationary support rod 18, a smooth metal lip 19 at the end of tank 12 and onto a pressure roller 20. The tape then passes through the nip 21 of the pressure roller 20 and a roll 22 which is to be embossed for use as an embossing roll.

Roll 22 is axially mounted for rotation as by being put as the work piece into a lathe 23. As shown in the drawing, roll 22 rotates clockwise as indicated by the directional arrow and drives the pressure roller 20 counterclockwise while drawing tape 10 and the beads adhered thereto through the nip 21.

Rotating roll 22 at a surface speed of about ten inches per minute has been found to be satisfactory for a roll of about fourteen inches in diameter.

Pressure roller 20 is rotatably held by a support 24 and the tank 12 is fastened to an extension 25 of this support. The support 24 is fixed to a slide 26 movable by a worm screw crank 27 on way 28 to move pressure roller 20 toward or away from roll 22 in the lathe and to hold the pressure roller 20 a predetermined distance from the roll 22 during the embossing of the latter.

Way 28 is fixed to a carriage 29 which is mounted on another set of ways 30 for travel parallel to the axis of roll 22 when the roll is in the lathe. The carriage 29 is driven on the ways 30 by any suitable means as by a worm screw indicated at 31.

A dial indicator 32 is preferably mounted on the extension 25 of the pressure roller support 24 and bears against the support so as to provide means to indicate the extent of its deflections. This deflection is a measure of the embossing pressure applied which should be maintained constant. A suitable embossing pressure has been found to be about 50,000 to 60,000 pounds per square inch of contact area.

Vibrator rod 17 is constantly vibrated by any suitable means. As shown, rod 17 is carried by a vibrating arm 34 driven by an electromagnet vibrator 33 mounted on the side of tank 12 in a conventional "bell-buzzer" arrangement.

As tape 10 is drawn by the roll 22 from its roll and through the bath of glass beads in tank 12, beads adhere to the upper tacky or sticky side of the tape. Vibrating rod 17 maintains the tape in a constant state of vibration of sufficient amplitude and frequency to throw excess beads from the surface of the tape and a single layer of contiguous beads results.

The tape now coated with beads is pulled into the nip 21 of the pressure roller 20 and roll 22 by the rotation of roll 22. The tape thickness is preferably somewhat less than one-half the diameter of the beads to properly cushion the beads for best results.

Pressure roller 20 is preferably harder than the roll 22 to be embossed. The pressure roller is preferably hardened to a Brinell hardness of about 270 so that only slight indentations are made in its surface from the glass beads under embossing pressure. This keeps the tape and beads from slipping on the pressure roller.

The embossing is done by passage of the tape through the nip of pressure roller 20 and roll 22 while the pressure roller 20 is being held a predetermined distance from roll 22. This predetermined distance is easily obtained by operating the worm screw crank 27 according to the support deflections measured on dial indicator 32.

Due to the embossing pressure, the tape is pressed in the nip 21 of the roll and roller. The hold back pressure of brake 13 should be sufficient to cause a tension in the tape which will absorb the upward flow of the synthetic resin or cellulose tape from the nip under the embossing pressure, otherwise wrinkling of the tape may occur and cause faulty embossing.

The tape acts to uniformly distribute the pressure over a substantial area of the rear surfaces of the beads being pressed into roll 22 so that a high pressure can be applied without fracturing the beads. Because of the flow characteristics of the material of the tape, or of the adhesive, or of both, a support hydraulic in character is afforded the beads. It is easily possible to press a bead to make a full hemispherical indentation in roll 22, a procedure not possible by the methods previously proposed.

In addition, because of the substantially complete coverage of the tape by beads in a single thickness layer on the tape, a uniformly dense embossed pattern may be obtained, with well formed and clean impressions. A density of 30,000 impressions per square inch of .0058" diameter beads may be obtained by this method.

Another advantage to this method of embossing exists where a roll is to be re-embossed to obtain an even greater number of impressions and greater coverage of the roll surface. For re-embossing, a roll must be perfectly clean as any glass dust, fragments and foreign matter present will be impressed into its surface. By using the method of embossing here described with tape held glass beads, bead fractures are minimized or prevented and a clean surface with clear impressions results.

On the second embossing using the tape held glass beads, a large percentage of the small spaces between the previous bead impressions on the embossed roll, are also embossed.

While, as shown, the backing strip and pressure roller are of less width than the roll being embossed, and a suitable lead angle, as indicated at 35 in Fig. 2, is given the pressure roller so as to press the beads in a helical path around the roll with the edges of the turns of the helix abutting or overlapping, where the roll dimensions permit, the width of the tape and pressure roll may be coextensive with the roll being embossed. In the latter case the length of the tape need not exceed the circumference of the roll being embossed.

What is claimed is:

1. The method of embossing a metal roll with glass beads which comprises fastening a layer of the beads to a deformable tape and passing said tape and beads between the roll to be embossed and a pressure roller with the beads in contact with the surface of the roll to be embossed, the beads being fire-polished whereby a substantially spherical shape and optically smooth surface are obtained and being uniform in diameter, any variation in diameter being within the range of one to two-thousandths inch.

2. The method of embossing a metal roll with glass beads which comprises fastening a layer of the beads by adhesive to a tape and passing said tape with the beads adhered thereto between the roll to be embossed and a pressure roller held spaced a distance therefrom less than the diameter of the beads and thickness of the tape, the beads being in contact with the roll to be embossed and the beads being fire-polished whereby a substantially spherical shape and optically smooth surface are obtained and being uniform in diameter, any variation in diameter being within the range of one to two-thousandths inch.

3. The method of forming a metal roll for embossing a strip of optically homogeneous material to secure optically active projections on one surface thereof, which comprises the steps of attaching to one surface of a tape of flexible material a layer of separate and geometrically symmetrical and substantially homologous objects in substantially contiguous relation on the tape, the objects having surfaces of optical smoothness and being substantially uniform in size, applying the layer of objects to the surface of the roll, and pressing the layer of objects into the roll for forming cavities therein.

4. The method of forming a metal roll for embossing a strip of optically homogeneous material to secure optically active projections on one surface thereof, which comprises the steps of attaching to one surface of a tape of flexible material a layer of separate spherical objects in substantially contiguous relation on the tape, the spherical objects having surfaces of optical smoothness and being substantially uniform in size, applying the layer of objects to the surface of the roll, and pressing the layer of objects into the roll for forming cavities therein.

5. The method of forming a steel roll of approximately 200 Brinell hardness for embossing a strip of optically homogeneous material to secure optically active projections on one surface thereof, which comprises the steps of attaching to one surface of a tape of flexible material a layer of separate and fire-formed glass beads in substantially contiguous relation on the tape, the beads having surfaces of optical smoothness and being substantially uniform in size, applying the layer of objects to the surface of the roll, and pressing a layer of objects into the roll for forming cavities therein.

6. The method of forming a metal roll for embossing a strip of optically homogeneous material to secure optically active projections on one surface thereof, which comprises passing a tape coated on one surface with an adhesive through a bath of separate and geometrically symmetrical objects of substantially uniform size and with optically smooth surfaces for covering the adhesive surface with a layer of objects in substantially contiguous relation, applying the layer of objects to the roll surface, and pressing the layer of objects into the roll for forming cavities therein.

7. The method of forming a metal roll for embossing a strip of optically homogeneous material to secure optically active projections on one surface thereof, which comprises passing a tape coated on one surface with an adhesive through a bath of separate and geometrically symmetrical objects of substantially the same size and shape for covering the adhesive surface with a layer of objects in substantially contiguous relation, the objects having optically smooth surfaces removing the objects tending to form a second layer on the tape, applying the layer of objects to the roll surface, and pressing the layer of objects into the roll for forming cavities therein.

8. The method of forming a metal roll for embossing a strip of optically homogeneous material to secure optically active projections on one surface thereof, and comprising attaching to one surface of a tape of flexible material a layer of separate objects in substantially contiguous relation, the objects being geometrically symmetrical and of substantially the same in shape and size and having optically smooth surfaces, passing the tape with the objects in contact with the roll, and pressing the tape and its layer of objects against the roll whereby the objects impress cavities in the roll.

9. The method of forming a metal roll for embossing a strip of optically homogeneous material to secure optically active projections on one surface thereof, and comprising attaching to one surface of a tape of flexible material a layer of separate objects in substantially contiguous relation, the objects being geometrically symmetric and being substantially the same in shape and size and having optically smooth surfaces, passing the tape with the objects in contact with the roll, applying pressure to the back of the tape for pressing the layer of objects partially into the roll and thereby forming cavities in the roll.

10. In a method for forming a metal roll for embossing a strip of optically homogeneous material with optically active projections forming one of the surfaces thereof, the roll surface having only a cut turned surface, the steps of attaching to one surface of a tape of flexible material a layer of separate objects in substantially contiguous relation, the objects being geometrically symmetrical and of substantially the same shape and size and having a surface smoother than the cut surface of the roll, passing the tape with the objects in contact with the roll, and pressing the tape and layer of objects against the roll whereby the objects impress cavities in the roll.

11. In a machine for forming a metal roll for embossing a strip of opticaly homogeneous material with optically active projections from one surface of the material, a receptacle having multiplicity of separate and geometrically substantially homologous objects therein, a tape for attachment thereto of a layer of objects over substantially the entire one surface of the tape, a support for rotation of the roll under pressure, a roller rotatable at given spacing from the roll, the tape extending between the roll and the roller with the layer of objects in contact with the roll, and means for rotating the roll whereby the objects are pressed partially into the roll to produce cavities therein.

12. In a machine for forming a metal roll for embossing a strip of optically homogeneous material with optically active projections from one surface of the material, a receptacle having multiplicity of separate objects of substantially the same shape and size, a tape having an adhesive coating on one surface thereof, means to deposit a layer of the objects on the adhesively coated surface of the tape, a support for rotation of the roll under pressure, a roller rotatable at given spacing from the roll, the tape extending between the roll and the roller with the layer of objects in contact with the roll, and means for rotating the roll whereby the objects are pressed partially into the roll to produce cavities therein.

13. Apparatus for embossing a highly polished metal roll with fire polished glass beads comprising a tank for glass beads, a rotatable support for the roll to be embossed, a pressure roller harder than the roll, means to hold the pressure roller a predetermined distance from the roll, a pressure sensitive adhesive coated tape extending between the roll and roller and passing through the bead tank for beads to adhere in a layer to the tape, the adhesive coating of the tape being adjacent the roll, a vibrator connected with said tape to vibrate the tape and shake off non-adhered beads, and means to drive said rotatable support to rotate the roll and draw the tape through the bead tank, over the vibrator and between the roll and roller with the beads adhered to the tape pressed by the roller into the roll to form embossing cavities with highly polished surfaces.

14. Apparatus for embossing a polished metal roll with fire polished glass beads comprising a receptacle for a supply of beads, a support for the roll to be embossed, a pressure roller harder than the roll to be embossed, means to hold the pressure roller a predetermined distance from the roll, a tape extending between the roll and the roller, means to deposit a layer of beads on the side of the tape adjacent the roll, an adhesive binding the beads to the tape, and means to rotate the roll and draw the tape with beads adhered thereto between the roll and the roller to emboss the roll.

15. Apparatus for embossing a metal roll with spherical glass beads and comprising a receptacle for a supply of the beads, means for rotatably supporting the roll to be embossed, a pressure roller harder than the roll to be embossed, means for rotatably supporting the pressure roller at a predetermined distance from the roll, a tape extending between the roll and the roller, means to deposit a layer of beads on the side of the tape adjacent the roll, an adhesive on the tape for adhering the beads thereto, and means to rotate the roll and draw the tape with the layer of beads thereon between the roll and the roller to emboss the roll.

16. In a machine for forming a metal roll for embossing a strip of optically homogeneous material with optically active projections from one surface of the material, a receptacle having multiplicity of separate objects of substantially the same shape and size, a tape having an adhesive coating on one surface thereof, means to deposit a layer of the objects on the adhesively coated surface of the tape, means for removing from the tape those objects tending to form a second layer thereon, the tape extending between the roll and the roller with the layer of objects in contact with the roll, a roller rotatably supported at a spacing from the roll dependent on the depth of the cavities to be formed in the roll, and means for rotating the roll whereby the objects are pressed partially into the roll to produce cavities therein.

References Cited in the file of this patent

UNITED STATES PATENTS

| 1,784,866 | Fahrenwald | Dec. 16, 1930 |
| 2,024,007 | McColloch | Dec. 10, 1935 |
| 2,146,683 | McColloch | Feb. 7, 1939 |
| 2,293,843 | Marvin | Aug. 25, 1942 |
| 2,337,016 | Hillix | Dec. 14, 1943 |
| 2,337,018 | Hillix | Dec. 14, 1943 |
| 2,440,963 | Luce | May 4, 1948 |